US012768442B2

(12) United States Patent
Ogihara et al.

(10) Patent No.: US 12,768,442 B2
(45) Date of Patent: Oct. 20, 2026

(54) CONTROL MODE SWITCHING APPARATUS FOR VEHICLE

(71) Applicant: TOYOTA JIDOSHA KABUSHIKI KAISHA, Toyota (JP)

(72) Inventors: Takahiko Ogihara, Gotemba (JP); Shogo Ito, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/053,788

(22) Filed: Feb. 14, 2025

(65) Prior Publication Data

US 2025/0361934 A1 Nov. 27, 2025

(30) Foreign Application Priority Data

May 21, 2024 (JP) ................................ 2024-082332

(51) Int. Cl.
*F16H 59/02* (2006.01)
*F16H 59/04* (2006.01)

(52) U.S. Cl.
CPC ....... *F16H 59/0204* (2013.01); *F16H 59/044* (2013.01); *F16H 2059/0247* (2013.01)

(58) Field of Classification Search
CPC ............... F16H 59/0204; F16H 59/044; F16H 2059/0247; B60W 10/04; B60W 10/08; B60W 10/115
See application file for complete search history.

(56) References Cited

U.S. PATENT DOCUMENTS

| | | | | |
|---|---|---|---|---|
| 6,260,432 | B1 * | 7/2001 | Ehrmaier | F16H 59/0204 74/484 R |
| 9,964,950 | B2 | 5/2018 | Takano | |
| 10,017,116 | B2 | 7/2018 | Sato | |
| 10,310,508 | B2 | 6/2019 | Kunisa et al. | |
| 10,452,930 | B2 | 10/2019 | Sato | |
| 10,663,973 | B2 | 5/2020 | Hashimoto et al. | |
| 10,895,875 | B2 | 1/2021 | Hashimoto et al. | |
| 11,001,198 | B2 | 5/2021 | Morimura et al. | |
| 11,275,382 | B2 | 3/2022 | Hashimoto et al. | |
| 2021/0229598 | A1 | 7/2021 | Morimura et al. | |

(Continued)

FOREIGN PATENT DOCUMENTS

| | | | | |
|---|---|---|---|---|
| JP | 2006160012 A * | 6/2006 | | B60W 30/14 |
| JP | 2008051300 A * | 3/2008 | | F16H 59/0204 |

(Continued)

*Primary Examiner* — Tisha D Lewis
(74) *Attorney, Agent, or Firm* — SoraIP, Inc.

(57) ABSTRACT

A control mode switching apparatus for a vehicle that switches a control mode among a non-control mode in which a control amount is not changed, an auto mode in which the control amount is automatically changed, and a manual mode in which the control amount is manually changed, includes an operator to be operated by a driver, and a control unit configured to determine an aspect of operation when the operator is operated and switch the control mode based on the determined aspect of the operation, and the control unit performs switching between the non-control mode and the auto mode, switching between the non-control mode and the manual mode, and switching between the auto mode and the manual mode in accordance with the determined aspect of the operation.

2 Claims, 4 Drawing Sheets

(56) References Cited

U.S. PATENT DOCUMENTS

| | | | | |
|---|---|---|---|---|
| 2021/0380124 | A1 | 12/2021 | Urano et al. | |
| 2025/0033689 | A1* | 1/2025 | Tambo | B62D 1/286 |

FOREIGN PATENT DOCUMENTS

| | | | | |
|---|---|---|---|---|
| JP | 2009-243594 | A | 10/2009 | |
| JP | 2015-051683 | A | 3/2015 | |
| WO | WO-2024075672 | A1 * | 4/2024 | E02F 3/434 |

* cited by examiner

CONTROL MODE SWITCHING APPARATUS FOR VEHICLE

CROSS-REFERENCE TO RELATED APPLICATION

This application claims priority to Japanese Patent Application No. 2024-082332 filed on May 21, 2024, incorporated herein by reference in its entirety.

BACKGROUND

1. Technical Field

The present disclosure relates to a control mode switching apparatus for a vehicle such as an automobile.

2. Description of Related Art

In a vehicle such as an automobile, a control mode switching apparatus is known that, if an operator is operated, switches a control mode among a non-control mode in which a control amount is not changed, an auto mode in which the control amount is automatically changed, and a manual mode in which the control amount is manually changed.

For example, FIG. 8, and the like, of Japanese Unexamined Patent Application Publication No. 2009-243594 (JP 2009-243594 A) described below describes a control mode switching apparatus that switches a gear shift mode among a gear shift prohibition mode, a manual gear shift mode, and an automatic gear shift mode by levers of paddle shifts, and a mode switching switch being operated.

SUMMARY

In the control mode switching apparatus in the related art, there is room for improvement to enable the control mode to be easily switched among the three modes. Particularly, it is necessary to go through the non-control mode to switch the control mode between the auto mode and the manual mode. Further, a driver has to operate a plurality of types of operators in aspects different in accordance with a current mode to switch the control mode to a target mode.

For example, in the control mode switching apparatus described in JP 2009-243594 A described above, in order to switch the gear shift mode to a target mode, a driver has to confirm a current mode and operate the levers of the paddle shifts and/or the mode switching switch in aspects different in accordance with the current mode.

The present disclosure provides a control mode switching apparatus for a vehicle modified so as to enable a control mode to be easily switched among three modes compared to the control mode switching apparatus in the related art.

According to the present disclosure, a control mode switching apparatus (100) for a vehicle that switches a control mode among a non-control mode in which a control amount is not changed, an auto mode in which the control amount is automatically changed, and a manual mode in which the control amount is manually changed, is provided.

In one configuration, the control mode switching apparatus includes an operator (a pair of levers 112L and 112R of paddle shifts) to be operated by a driver, and a control unit (10) configured to determine an aspect of operation when the operator is operated (S30, S50, S70) and switch the control mode based on the determined aspect of the operation (S40, S60, S80), in which the control unit is configured to perform switching between the non-control mode and the auto mode, switching between the non-control mode and the manual mode, and switching between the auto mode and the manual mode in accordance with the determined aspect of the operation.

According to the above-described configuration, the switching between the non-control mode and the auto mode, the switching between the non-control mode and the manual mode, and the switching between the auto mode and the manual mode are performed in accordance with the determined aspect of the operation. It is therefore possible to perform switching between two modes among the three modes without going through a mode other than the two modes. It is therefore possible to switch the control mode easily and promptly compared to the control mode switching apparatus in the related art in which it is necessary to go through a mode other than the two modes.

Further, in another configuration, a control mode switching apparatus (100) includes an operator (a pair of levers 112L and 112R of paddle shifts) to be operated by a driver, and a control unit (10) configured to determine an aspect of operation when the operator is operated by a driver (S30, S50, S70) and switch the control mode based on the determined aspect of the operation (S40, S60, S80), in which the control unit is configured to switch a current control mode to the auto mode (S40) when the determined aspect of the operation is a first aspect (S30), switch the current control mode to the manual mode (S60) when the determined aspect of the operation is a second aspect (S50), and switch the current control mode to the non-control mode (S80) when the determined aspect of the operation is a third aspect (S70).

According to the above-described configuration, when the determined aspect of the operation is the first aspect, the current control mode is switched to the auto mode. When the determined aspect of the operation is the second aspect, the current control mode is switched to the manual mode. Further, when the determined aspect of the operation is the third aspect, the current control mode is switched to the non-control mode.

The first to the third aspects correspond to the control modes after switching, that is, switching target control modes on a one-to-one basis. Thus, the driver can switch the current control mode to the target control mode without confirming the current control mode. It is therefore possible to switch the control mode easily and promptly compared to the control mode switching apparatus in the related art in which it is necessary to execute operation after confirming the current control mode and determining the operator and an aspect of the operation based on the result.

In one aspect of the present disclosure, at least the first and the second aspects are different from each other.

Further, in another aspect of the present disclosure, the operator is at least one of a left or right lever of a paddle shift that is provided at a steering wheel and is to be used to change a shift position.

Still further, in still another aspect of the present disclosure, the operator is a shift lever of an automatic transmission having a manual transmission mode.

In the above description, to help understanding of the present disclosure, name and/or reference numerals to be used in the embodiments are appended in brackets to components of the disclosure corresponding to the embodiments to be described later. However, the respective components of the present disclosure are not limited to the components in the embodiments corresponding to the name and/or reference numerals appended in brackets. Other objects, other features and associated advantages of the present disclosure will be easily understood from description of the embodiments of the present disclosure which will be described below with reference to the drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A control mode switching apparatus for a vehicle according to an embodiment of the present disclosure will be described in detail below with reference to the accompanying drawings.

Figure 1:
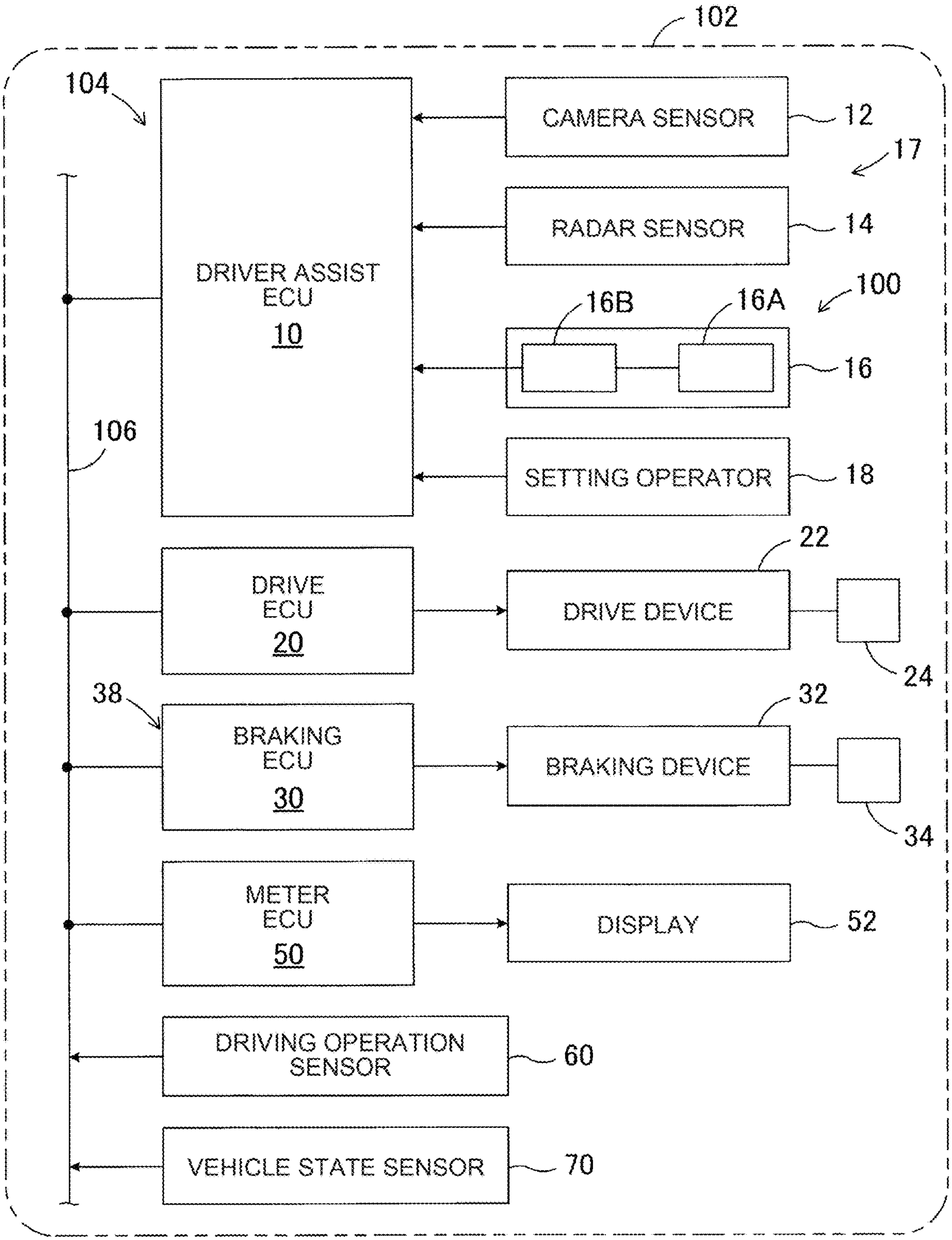
FIG. 1 is a schematic configuration diagram illustrating a driver assistance apparatus on which a control mode switching apparatus according to an embodiment is mounted.

As illustrated in FIG. 1, a control mode switching apparatus 100 according to the embodiment of the present disclosure is applied to a driver assistance apparatus 104 of a vehicle 102 and includes a driver assist ECU 10. The vehicle 102, which is a vehicle capable of performing autonomous driving, includes a drive ECU 20, a braking ECU 30 and a meter ECU 50. The ECU means an electronic control unit including a microcomputer as a main part.

The microcomputer of each ECU includes a CPU, a ROM, a RAM, a rewritable non-volatile memory (N/M), an interface (I/F), and the like. The CPU implements various kinds of functions by executing an instruction (program, routine) stored in the ROM. Further, these ECUs are connected to each other so as to be able to exchange data via a controller area network (CAN) 106. Thus, a detection value, or the like, of a sensor (including a switch) connected to a specific ECU is also transmitted to other ECUs.

The driver assist ECU 10 is a central control apparatus that performs driver assist control such as deceleration assist control, tracking inter-vehicular distance control and lane-keep control. In the embodiment, the driver assist ECU 10 executes driver assist control that assists driving of a driver when the vehicle 102 travels and further executes switching control of a control mode of the driver assist control in cooperation with other ECUs.

To the driver assist ECU 10, a camera sensor 12, a radar sensor 14, an operation device 16 and a setting operator 18 are connected. The camera sensor 12 and the radar sensor 14 respectively include a plurality of camera devices and a plurality of radar devices and function as an object information acquisition device 17 that acquires object information around the vehicle 102.

While not illustrated in the drawing, each camera device of the camera sensor 12 includes a camera unit that captures an image of a circumference of the vehicle 102 and a recognition unit that analyzes image data obtained by imaging by the camera unit to recognize objects such as white lines of roads and other vehicles. The recognition unit supplies information regarding the recognized objects to the driver assist ECU 10 for each predetermined period.

Each radar device of the radar sensor 14 detects a distance between an own vehicle and a three-dimensional object, relative speed between the own vehicle and the three-dimensional object, a relative position (direction) of the three-dimensional object with respect to the own vehicle, and the like, using a radio wave in a millimeter waveband and supplies information representing the detected distance, relative speed, relative position, and the like, to the driver assist ECU 10 for each predetermined period. Note that a light detection and ranging (LiDAR) may be used in place of the radar sensor 14 or in addition to the radar sensor 14.

The operation device 16 includes an operator 16A to be operated by the driver and a switch 16B that is switched between ON and OFF when the operator is operated, and information regarding ON and OFF of the switch 16B is transmitted to the driver assist ECU 10. The driver assist ECU 10 determines an aspect of operation when the operator 16A is operated by the driver based on ON and OFF of the switch 16B.

Figure 2:
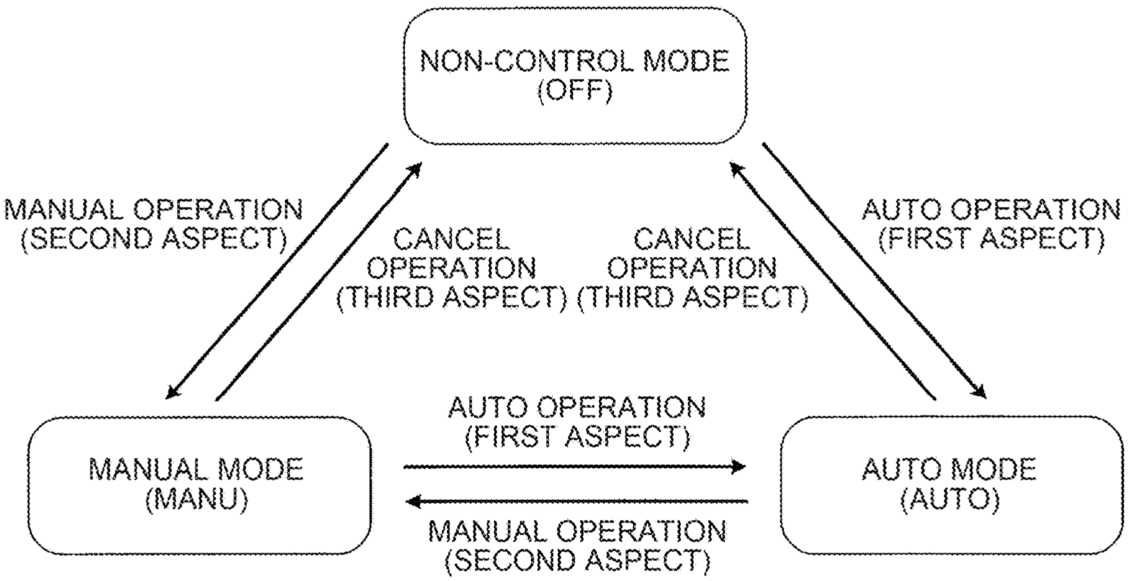
FIG. 2 is a view illustrating a relationship among switching operation of a control mode among an auto mode, a manual mode and a non-control mode, a current control mode, and an aspect of operation.

Further, the driver assist ECU 10 switches a control mode of the driver assist control between a non-control mode and an auto mode, between the non-control mode and a manual mode and between the auto mode and the manual mode as illustrated in FIG. 2 based on the determined aspect of the operation. Particularly, the driver assist ECU 10 switches a current control mode respectively to the auto mode, the manual mode and the non-control mode when the determined aspect of the operation is a first aspect, a second aspect and a third aspect.

The non-control mode is a mode in which deceleration as a control amount is not changed, the auto mode is a mode in which the deceleration is automatically changed, and the manual mode is a mode in which the deceleration is manually changed. Note that as illustrated in FIG. 2, operation of the first aspect is referred to as auto operation, operation of the second aspect is referred to as manual operation, and operation of the third aspect is referred to as cancel operation.

The setting operator 18 is provided at a position operable by the driver and is operated by the driver. While not illustrated in FIG. 1, the setting operator 18 includes a deceleration assist switch. The driver assist ECU 10 executes the driver assist control when the deceleration assist switch is in an ON state as will be described in detail later.

A drive device 22 that accelerates the vehicle 102 by providing driving force to drive wheels 24 is connected to the drive ECU 20. The drive ECU 20 controls the drive device 22 such that the driving force to be generated by the drive device 22 changes in accordance with driving operation by the driver at normal times and, when a command signal is received from the driver assist ECU 10, controls the drive device 22 based on the command signal.

A braking device 32 that decelerates the vehicle 102 by braking by providing braking force to wheels 34 is connected to the braking ECU 30. The wheels 34 may include the wheels 24. The braking ECU 30 controls the braking device such that the braking force to be generated by the braking device 32 changes in accordance with braking operation by the driver at normal times and, when a command signal is received from the driver assist ECU 10, performs automatic braking by controlling the braking device 32 based on the command signal.

Thus, the braking ECU 30 and the braking device 32 cooperate with each other to function as an automatic braking device 38. Note that when the braking force is provided to the wheels by deceleration assist control, a brake light not illustrated in FIG. 1 is lighted.

A touch panel display 52 that displays conditions, and the like, of control by the driver assist ECU 10 is connected to the meter ECU 50. The display 52 may be, for example, a multi-information display that displays the meters and various kinds of information or may be a monitor display of a navigation device. As will be described later, when a signal is received from the driver assist ECU 10, the display 52 displays information regarding the deceleration assist control and information regarding the control mode.

A driving operation sensor 60 and a vehicle state sensor 70 are connected to the CAN 106. Information detected by the driving operation sensor 60 and the vehicle state sensor 70 (referred to as sensor information) is transmitted to the CAN 106. The sensor information transmitted to the CAN 106 can be utilized as appropriate at each ECU. Note that the sensor information is information of the sensor connected to a specific ECU and may be transmitted from the specific ECU to the CAN 106.

The driving operation sensor 60 includes a driving operation amount sensor that detects an acceleration operation amount, a braking operation amount sensor that detects a master cylinder pressure or pedal force on a brake pedal (not illustrated), and a brake switch that detects whether or not the brake pedal is operated. Further, the driving operation sensor 60 includes a steering angle sensor that detects a steering angle, a steering torque sensor that detects steering torque, and the like.

The vehicle state sensor 70 includes a vehicle speed sensor that detects a vehicle speed V of the vehicle 102, a longitudinal acceleration sensor that detects acceleration in a longitudinal direction of the vehicle, a lateral acceleration sensor that detects acceleration in a lateral direction of the vehicle, a yaw rate sensor that detects a yaw rate of the vehicle, and the like. Further, the vehicle state sensor 70 includes a shift position sensor that detects a shift position (shift range) of a transmission that is not illustrated in the drawing.

First Embodiment

Figure 3:
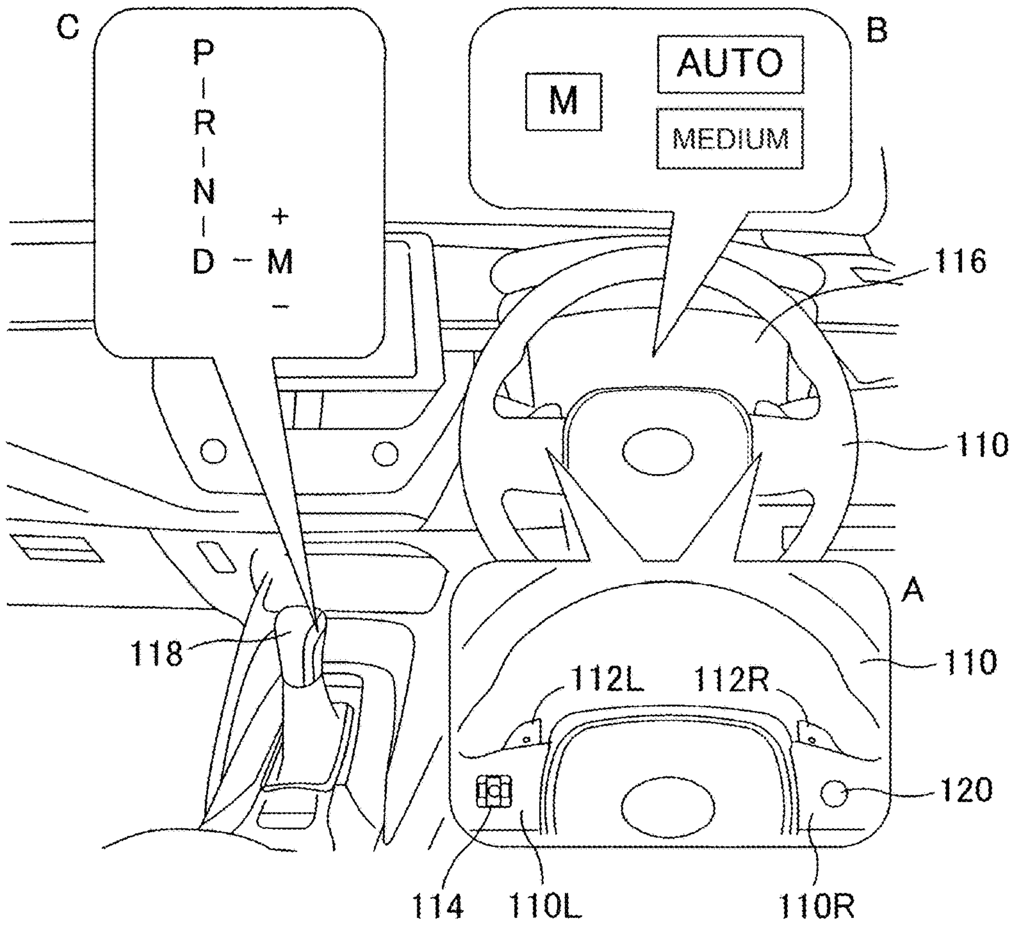
FIG. 3 is a view illustrating an interior of a vehicle on which the control mode switching apparatus is mounted.

In a first embodiment, the operator 16A of the operation device 16 is a pair of levers 112L and 112R of paddle shifts that are provided at left and right spoke portions 110L and 110R of a steering wheel 110 and is to be operated by the fingers of the driver as illustrated in a balloon A of FIG. 3. As is well known, the paddle shift is a device provided at the steering wheel 110 to change the shift position.

For example, if the lever 112L of the left paddle shift is pulled toward the driver once, the shift position is lowered (shift down) by one stage, and if the lever 112L is successively pulled toward the driver a plurality of times, the shift position is lowered by a plurality of stages. If the lever 112R of the right paddle shift is pulled toward the driver once, the shift position is increased (shift up) by one stage, and if the lever 112R is successively pulled toward the driver a plurality of times, the shift position is increased by a plurality of stages. Even if the lever 112L and/or 112R is continuously pulled over a period equal to or longer than a reference period, the shift position does not change. Pulling of the lever once is referred to as “short pulling”, and continuous pulling of the lever is referred to as “long pulling”.

The switch 16B of the operation device 16 includes a pair of switches provided so as to correspond to the levers 112L and 112R. Each switch is in an OFF state at normal times, that is, when the corresponding lever is not pulled, and is put into an ON state if the corresponding lever is pulled. Information as to whether or not each switch is in an ON state is supplied to the driver assist ECU 10.

In the first embodiment, the driver assist control is switching control of a deceleration degree of the vehicle while the accelerator pedal is not pressed by the driver and the accelerator is in an OFF state and switches the deceleration degree in three stages of high, medium (standard) and low. When the control mode is the non-control mode, the driver assist ECU 10 does not change the deceleration degree and sets the deceleration degree at a medium stage. In contrast, when the control mode is the auto mode, the driver assist ECU 10 changes the deceleration degree in accordance with driving conditions of the vehicle such as, for example, the vehicle speed V and a curvature of a traveling road ahead of the vehicle 102. Further, when the control mode is the manual mode, the driver assist ECU 10 changes the deceleration degree in accordance with increase/decrease operation by the driver using a cross switch 114 illustrated in FIG. 3.

Note that the deceleration degree may be changed in an arbitrary manner. For example, the change of the deceleration degree may be implemented by the shift position of the transmission being automatically changed or may be implemented by automatic change of the shift position and/or automatic control of the braking device 32.

As illustrated in a balloon B in FIG. 3, the current control mode and the deceleration degree are displayed on the multi-information display 116. The display of the control mode may be “OFF” when the current control mode is the non-control mode, may be “AUTO” when the current control mode is the auto mode, and may be “MANU” when the current control mode is the manual mode. Further, the display of the deceleration degree may be respectively “high”, “medium” and “low” when the deceleration degree is high, medium and low.

In the embodiment, the transmission (not illustrated) of the vehicle 102 is an automatic transmission having a manual transmission mode. FIG. 3 illustrates a shift lever 118 of the automatic transmission. As illustrated in a balloon C in FIG. 3, the shift lever 118 is switched among a D range, an N range, an R range, a P range, and an M range (manual range). Further, when the shift lever 118 is pressed to a positive side in the M range, shift up is performed, and when the shift lever 118 is pressed to a negative side in the M range, shift down is performed.

As illustrated in the balloon B in FIG. 3, the shift position of the transmission may be also displayed on the multi-information display 116 as an alphabetic character of each shift range. Particularly, if the shift lever 118 is pressed to the positive side in the M range, M+ may be displayed, and when the shift lever 118 is pressed to the negative side in the M range, M− may be displayed.

Figure 4:
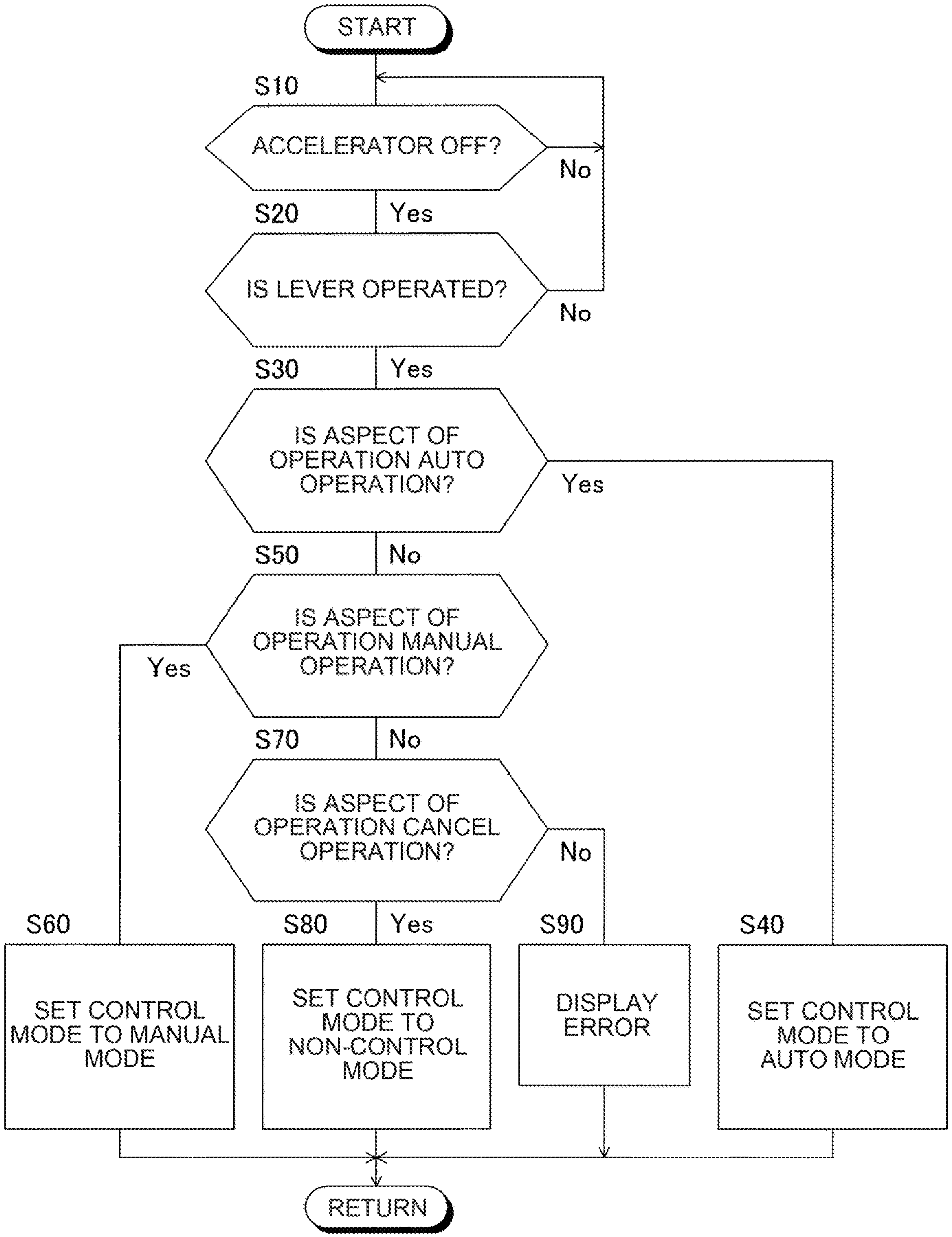
FIG. 4 is a flowchart corresponding to a control mode switching control program in a first embodiment.

In the first embodiment, the ROM of the driver assist ECU 10 stores a control mode switching control program of the deceleration degree of the vehicle while the accelerator is in an OFF state corresponding to the flowchart indicated in FIG. 4. The control by the flowchart indicated in FIG. 4 is repeatedly executed for each predetermined period by the CPU of the driver assist ECU 10 under conditions where the driver assist switch is in an ON state.

First, in step S10, the CPU determines whether or not the accelerator is in an OFF state based on the accelerator operation amount detected by a driving operation amount sensor of the driving operation sensor 60. When a negative determination result is obtained, the present control ends once, and when a positive determination result is obtained, the present control proceeds to step S20.

In step S20, the CPU determines whether or not the lever 112L and/or 112R of the paddle shift that is the operator 16A of the operation device 16 is operated. When a negative determination result is obtained, the present control ends once, and when a positive determination result is obtained, the present control proceeds to step S30.

In step S30, the CPU determines whether or not the aspect of the operation of the lever 112L and/or 112R of the paddle shift is the auto operation. When a negative determination result is obtained, the present control proceeds to step S50, and when a positive determination result is obtained, the present control proceeds to step S40.

In step S40, the CPU sets a switching control mode of the deceleration degree of the vehicle to the auto mode and displays AUTO on the multi-information display 116 by outputting a command signal to the meter ECU 50.

In step S50, the CPU determines whether or not the aspect of the operation of the lever 112L and/or 112R of the paddle shift is the manual operation. When a negative determination result is obtained, the present control proceeds to step S70, and when a positive determination result is obtained, the present control proceeds to step S60.

In step S60, the CPU sets the switching control mode of the deceleration degree of the vehicle to the manual mode and displays MANU on the multi-information display 116 by outputting a command signal to the meter ECU 50.

In step S70, the CPU determines whether or not the aspect of the operation of the lever 112L and/or 112R of the paddle shift is the cancel operation. When a negative determination result is obtained, the present control proceeds to step S90, and when a positive determination result is obtained, the present control proceeds to step S80.

In step S80, the CPU sets the switching control mode of the deceleration degree of the vehicle to the non-control mode and displays OFF on the multi-information display 116 by outputting a command signal to the meter ECU 50.

In step S90, the CPU displays an error on the multi-information display 116 by outputting a command signal to the meter ECU 50 and encourages the driver to redo the operation.

The switching operation, the current control mode and the aspect of the operation in the first embodiment are as indicated in the following Table 1. Note that in the first embodiment, aspects of the auto operation, the manual operation and the cancel operation are different from each other. Thus, in step S30, S50 and S70, the current mode is not determined.

TABLE 1

| Switching operation | Current mode | Aspect of operation |
|---|---|---|
| Auto operation | Non-control<br>Manual | Long pulling of both sides |
| Manual operation | Non-control<br>Auto | Long pulling of right side |
| Cancel operation | Auto<br>Manual | Long pulling of left side |

First Modification

Switching operation, a current control mode and an aspect of operation in a first modification are as indicated in the following Table 2. Note that in the first modification and second and third modifications which will be described later in which the aspect of the operation includes short pulling of the levers, when the accelerator is in an OFF state, shift change by the paddle shift may be invalid. In other words, shift change by manual operation may be performed only by the shift lever 118.

TABLE 2

| Switching operation | Current mode | Aspect of operation |
|---|---|---|
| Auto operation | Non-control<br>Manual | Long pulling of both sides |
| Manual operation | Non-control<br>Auto | Short pulling of one side |
| Cancel operation | Auto<br>Manual | Long pulling of both sides<br>Short pulling of one side |

Figure 5:
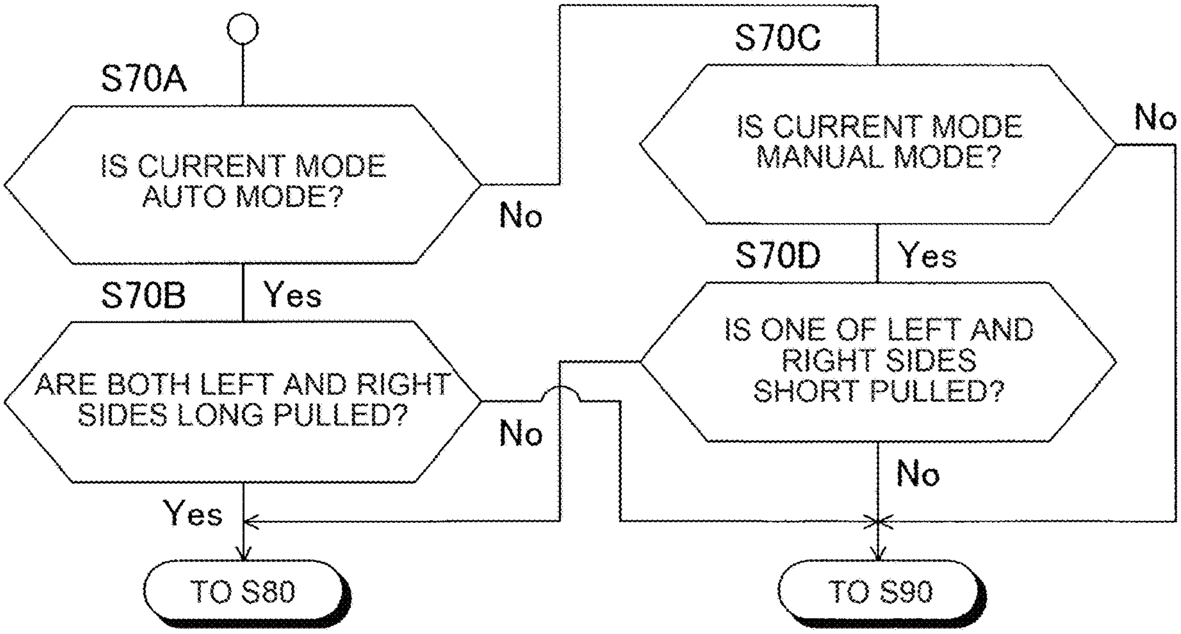
FIG. 5 is a flowchart indicating sub-routines in step S70 in a first modification.

In the first modification, the aspect of the operation when the switching operation is the cancel operation is different depending on the current control mode. Thus, in step S30, when the current mode is the non-control mode or the manual mode, and the aspect of the operation is long pulling of both the left and right levers, the switching operation is determined as the auto operation. Further, in step S50, when the current mode is the non-control mode or the auto mode, and the aspect of the operation is short pulling of one of the left and right levers, the switching operation is determined as the manual operation. Still further, in step S70, determination is performed in accordance with sub-routines indicated in FIG. 5.

In step S70A, it is determined whether or not the current control mode is the auto mode. When a negative determination result is obtained, that is, when the current control mode is the manual mode, the present control proceeds to step S70C, and when a positive determination result is obtained, the present control proceeds to step S70B. In step S70B, it is determined whether or not both the left and right levers 112L and 112R are long pulled. When a negative determination result is obtained, the present control proceeds to step S90, and when a positive determination result is obtained, the present control proceeds to step S80.

In step S70C, it is determined whether or not the current control mode is the manual mode. When a negative determination result is obtained, the present control proceeds to step S90, and when a positive determination result is obtained, the present control proceeds to step S70D. In step S70D, it is determined whether or not one of the left and right levers is short pulled. When a negative determination result is obtained, the present control proceeds to step S90, and when a positive determination result is obtained, the present control proceeds to step S80.

Second Modification

Switching operation, a current control mode and an aspect of operation in a second modification are as indicated in the following Table 3.

TABLE 3

| Switching operation | Current mode | Aspect of operation |
|---|---|---|
| Auto operation | Non-control<br>Manual | Long pulling of right side |
| Manual operation | Non-control<br>Auto | Long pulling of left side or<br>short pulling of left side |

TABLE 3-continued

| Switching operation | Current mode | Aspect of operation |
|---|---|---|
| Cancel operation | Auto | Long pulling of right side |
| | Manual | Short pulling of one side |

Figure 6:
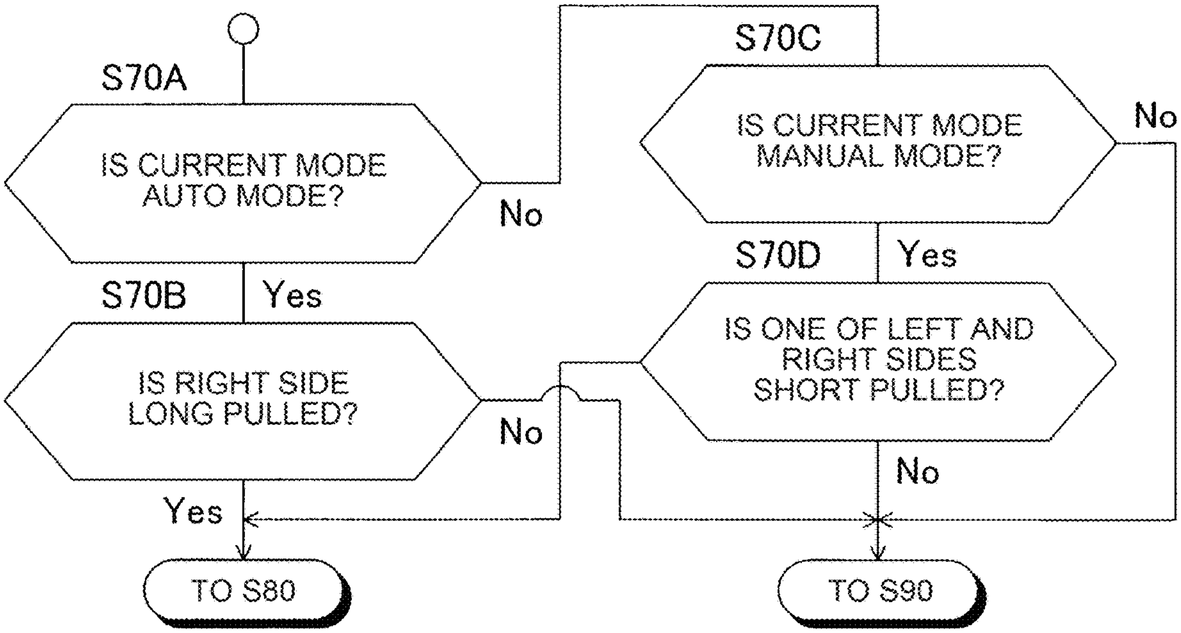
FIG. 6 is a flowchart indicating sub-routines in step S70 in a second modification.

Also in the second modification, the aspect of the operation when the switching operation is the cancel operation is different depending on the current control mode. Thus, in step S30, when the current mode is the non-control mode or the manual mode, and the aspect of the operation is long pulling of the right lever, the switching operation is determined as the auto operation. Further, in step S50, when the current mode is the non-control mode or the auto mode, and the aspect of the operation is long pulling or short pulling of the left lever, the switching operation is determined as the manual operation. Still further, in step S70, determination is performed in accordance with sub-routines indicated in FIG. 6.

In step S70A, it is determined whether or not the current control mode is the auto mode. When a negative determination result is obtained, that is, when the current control mode is the manual mode, the present control proceeds to step S70C, and when a positive determination result is obtained, the present control proceeds to step S70B. In step S70B, it is determined whether or not the right lever 112R is long pulled. When a negative determination result is obtained, the present control proceeds to step S90, and when a positive determination result is obtained, the present control proceeds to step S80.

In step S70C, it is determined whether or not the current control mode is the manual mode. When a negative determination result is obtained, the present control proceeds to step S90, and when a positive determination result is obtained, the present control proceeds to step S70D. In step S70D, it is determined whether or not one of the left and right levers is short pulled. When a negative determination result is obtained, the present control proceeds to step S90, and when a positive determination result is obtained, the present control proceeds to step S80.

Third Modification

In a third modification, change of the shift position by the paddle shift is performed using only the lever 112L of the left paddle shift. For example, when the lever 112L is short pulled, the shift position is lowered by one stage, and when the lever 112L is long pulled, the shift position is increased by one stage.

Switching operation, a current control mode and an aspect of operation in the third modification are indicated as the following Table 4.

TABLE 4

| Switching operation | Current mode | Aspect of operation |
|---|---|---|
| Auto operation | Non-control | Long pulling of both sides |
| | Manual | |
| Manual operation | Non-control | Long pulling of right side |
| | Auto | |
| Cancel operation | Auto | Short pulling of right side |
| | Manual | |

Second Embodiment

In a second embodiment, the operator 16A of the operation device 16 is the shift lever 118 of the automatic transmission. Note that in the second embodiment, when the accelerator is in an OFF state, shift change by the shift lever 118 may be invalid. In other words, shift change by manual operation may be performed only by the lever of the paddle shift.

Switching operation, a current control mode and an aspect of operation in the second embodiment are as indicated in the following Table 5. Note that under conditions where the control mode is the manual mode, increase of the deceleration degree of the vehicle may be implemented by the shift lever 118 being pressed to the negative side in the M range, and decrease of the deceleration degree of the vehicle may be implemented by the shift lever being pressed to the positive side in the M range.

TABLE 5

| Switching operation | Current mode | Aspect of operation |
|---|---|---|
| Auto operation | Non-control | M range |
| | Manual | Long press (+ or −) |
| Manual operation | Non-control | M range |
| | Auto | Short press (+ or −) |
| Cancel operation | Auto | Shift to D range |
| | Manual | |

Third Embodiment

In a third embodiment, the driver assist control is switching control of a target distances between vehicles in intervehicular distance control, and the target distance between vehicles is switched in three stages of long, medium (standard) and short. The driver assist ECU 10 does not change the target distance between vehicles and sets the target distance between vehicles to medium when the control mode is the non-control mode. In contrast, the driver assist ECU 10 changes the target distance between vehicles in accordance with driving conditions of the vehicle such as, for example, the vehicle speed V and a traffic volume of vehicles when the control mode is the auto mode. Further, the driver assist ECU 10 changes the target distance between vehicles in accordance with increase/decrease operation by the driver using the cross switch 114, or the like, illustrated in FIG. 3 when the control mode is the manual mode.

Further, in the third embodiment, the operator 16A of the operation device 16 is a push button 120 that is provided at the right spoke portion 110R of the steering wheel 110 and is to be operated by the fingers of the driver. Note that operation of the push button 120 includes three types of single press, double press and long press.

Switching operation, a current control mode and an aspect of operation in the third embodiment may be, for example, as indicated in the following Table 6.

TABLE 6

| Switching operation | Current mode | Aspect of operation |
|---|---|---|
| Auto operation | Non-control | Short press |
| | Manual | |
| Manual operation | Non-control | Double press |
| | Auto | |
| Cancel operation | Auto | Long press |
| | Manual | |

As will be understood from the above description, according to the present disclosure, it is possible to easily switch the control mode compared to the control mode switching apparatus in the related art.

Particularly, according to the above-described respective embodiments and respective modifications, the aspect of the operation is determined, and switching between the non-control mode and the auto mode, switching between the non-control mode and the manual mode, and switching between the auto mode and the manual mode are performed in accordance with the determined aspect of the operation. Thus, switching between two modes among the three modes can be performed without going through a mode other than the two modes. It is therefore possible to switch the control mode easily and promptly compared to the control mode switching apparatus in the related art in which it is necessary to go through a mode other than the two modes.

Further, according to the above-described respective embodiments and respective modifications, when the determined aspect of the operation is the auto operation as the first aspect, the current control mode is switched to the auto mode. When the determined aspect of the operation is the manual operation as the second aspect, the current control mode is switched to the manual mode. Further, when the determined aspect of the operation is the cancel operation as the third aspect, the current control mode is switched to the non-control mode.

The respective types of switching operation correspond to the control modes after switching, that is, the switching target control modes on a one-to-one basis. Thus, the driver can switch the current control mode to the target control mode without confirming the current control mode. It is therefore possible to switch the control mode easily and promptly compared to the control mode switching apparatus in the related art in which it is necessary to execute operation after confirming the current control mode and determining an aspect of operation based on the result.

Further, according to the above-described respective embodiments and respective modifications, at least the auto operation as the first aspect and the manual operation as the second aspect are different from each other. It is therefore possible to reduce a possibility that the driver confuses operation of switching the current control mode to the auto mode with operation of switching the current control mode to the manual mode.

Particularly, according to the first to the third embodiments and the third modification, the auto operation as the first aspect, the manual operation as the second aspect and the cancel operation as the third aspect are different from each other. It is therefore possible to further reduce a possibility that the driver confuses operation of switching the current control mode to another mode with operation of switching the current control mode to still another mode.

Further, according to the first embodiment and the first to the third modifications, the operator is the levers 112L and 112R of the paddle shifts that are provided at the steering wheel 110 and are to be used to change the shift position. It is therefore possible to effectively utilize the levers of the paddle shifts to perform switching of the control mode other than change of the shift position.

Still further, according to the second embodiment, the operator is the shift lever 118 of the automatic transmission having the manual transmission mode. It is therefore possible to effectively utilize the shift lever of the automatic transmission to perform switching of the control mode other than change of the shift position.

While specific embodiments of the present disclosure have been described in detail above, it would be clear for the person skilled in the art that the present disclosure is not limited to the above-described embodiments and other various embodiments are possible within the scope of the present disclosure.

For example, in the first and the second embodiments described above, the deceleration degree of the vehicle is switched in three stages while the accelerator is in an OFF state, and in the third embodiment, the target distance between vehicles in the inter-vehicular distance control is switched in three stages. However, the control target may be switched in three or more stages and may be substantially continuously switched.

Further, the control target regarding switching of the control mode may be an arbitrary target other than the deceleration degree of the vehicle while the accelerator is in an OFF state and the target distance between vehicles in the inter-vehicular distance control, that is, an arbitrary target of vehicle control.

Still further, the switching operation, the current control mode and the aspect of the operation in the above-described respective embodiments and respective modifications are examples and may be the switching operation, the current control mode and the aspect of the operation indicated in the above-described Table 1 to Table 6.

What is claimed is:

1. A control mode switching apparatus for a vehicle, the control mode switching apparatus being configured to switch a control mode among a non-control mode in which a control amount is not changed, an auto mode in which the control amount is automatically changed, and a manual mode in which the control amount is manually changed, the control mode switching apparatus comprising:

an operator provided at a steering wheel of the vehicle, the operator including a left lever and a right lever of a paddle shift used to change a shift position;

a processor; and a memory storing instructions that are executable by the processor and that cause the processor to determine an operation aspect of the operator in a case where at least one of the left lever and the right lever is operated by a driver of the vehicle, switch a current control mode to the auto mode in a case where the determined operation aspect is a first operation aspect being a long pulling of both the left lever and the right lever, switch the current control mode to the manual mode in a case where the determined operation aspect is a second operation aspect being a long pulling of the right lever, and switch the current control mode to the non-control mode in a case where the determined operation aspect is a third operation aspect being a long pulling of the left lever, wherein the first operation aspect, the second operation aspect, and the third operation aspect correspond to switching target control modes on a one-to-one basis such that the current control mode is switched to a corresponding switching target control mode without confirmation of the current control mode by the driver.

2. The control mode switching apparatus according to claim 1, further comprising a display configured to display the current control mode, wherein the display is configured to display a message indicating AUTO in a case where the current control mode is the auto mode, a message indicating MANU in a case where the current control mode is the manual mode, and a message indicating OFF in a case where the current control mode is the non-control mode.

* * * * *